United States Patent [19]
Ascoli et al.

[11] 3,937,645
[45] Feb. 10, 1976

[54] HEAT SEALING APPARATUS

[75] Inventors: Fred Ascoli, Maryland Heights; Robert R. Hermann, Ladue, both of Mo.

[73] Assignee: Standard Container Company, St. Louis, Mo.

[22] Filed: Jan. 11, 1974

[21] Appl. No.: 432,682

[52] U.S. Cl. ............... 156/522; 156/530; 156/581; 156/583; 53/329; 53/390
[51] Int. Cl.² ...................... B32B 31/00; B65B 7/28
[58] Field of Search ........... 156/522, 515, 583, 306, 156/581, 290, 530; 53/296, 329, 390, 15, 39, 297, 298, 373

[56] References Cited
UNITED STATES PATENTS

| | | | |
|---|---|---|---|
| 3,012,387 | 12/1961 | Jacobs et al. | 53/373 |
| 3,015,600 | 1/1962 | Cook | 156/515 X |
| 3,286,437 | 11/1966 | Cole | 53/296 |
| 3,295,295 | 1/1967 | Stewart et al. | 53/390 |
| 3,354,605 | 11/1967 | Amberg et al. | 53/329 X |
| 3,458,975 | 8/1969 | Burke | 53/390 X |
| 3,627,611 | 12/1971 | Bonk | 156/306 |
| 3,656,682 | 4/1972 | Giuliani | 229/37 R |
| 3,817,816 | 6/1974 | Watt | 53/329 X |
| 3,823,054 | 7/1974 | Balzer et al. | 156/583 X |

*Primary Examiner*—Douglas J. Drummond
*Assistant Examiner*—M. G. Wityshyn
*Attorney, Agent, or Firm*—Cohn, Powell & Hind

[57] ABSTRACT

This apparatus provides a means of sealing a plastic film cover over the open end of a plastic food container to render the container airtight and suitable for storage in a dispensing machine. The apparatus is self-contained and includes a base which carries a resiliently mounted support frame for the container, and a spindle-less dispensing frame for the film. A lever arm is pivotally mounted to the base rearwardly of the container support frame for swinging movement toward and away from the support frame. The lever carries a heat sealing head located forwardly of the pivot mounting for alignment with the container during heat sealing, and a cutter located rearwardly of the heat sealing head for clamping and severing the film adjacent the container support frame just prior to heat sealing. The heat sealing head includes a platen having peripheral margin portions registrable with the container flanges and grooved to provide improved heat sealing of the film to the container.

1 Claim, 8 Drawing Figures

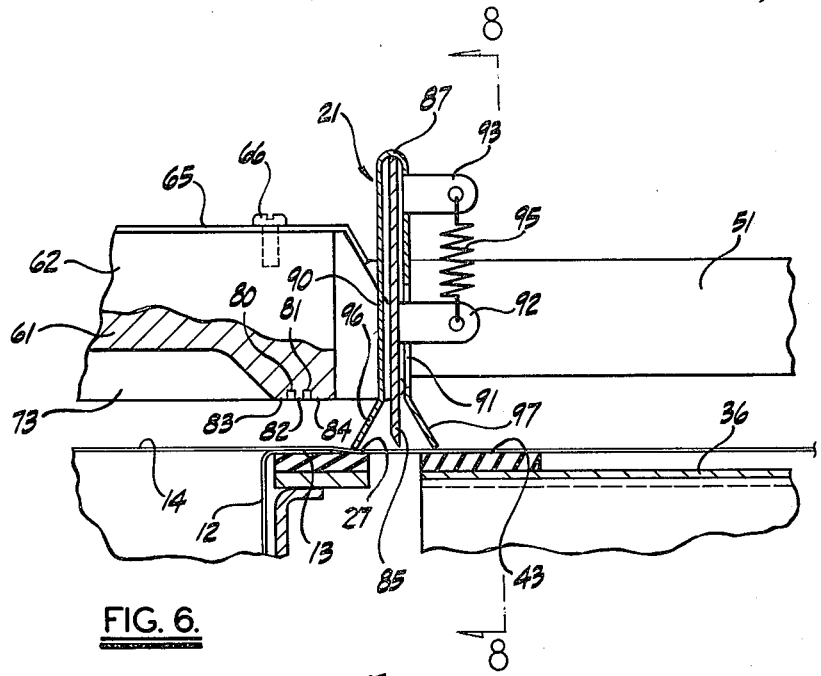
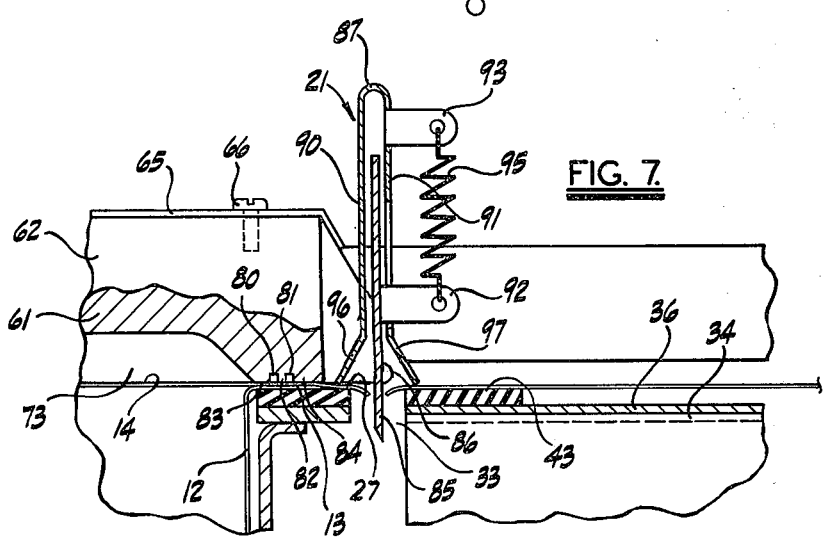
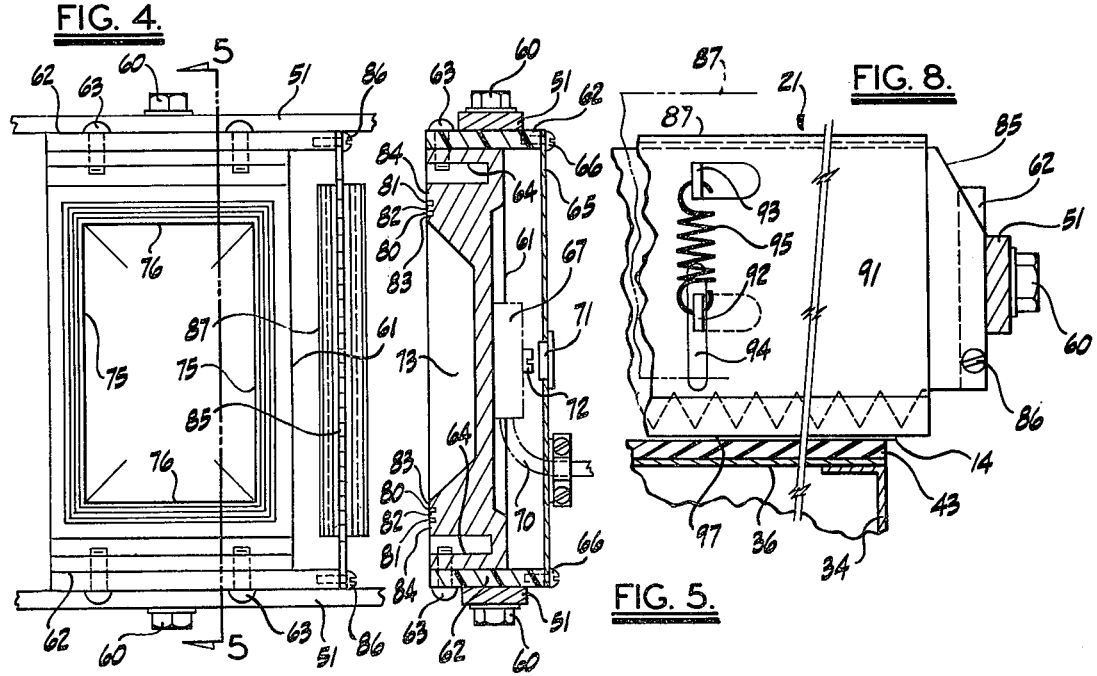

HEAT SEALING APPARATUS

BACKGROUND OF THE INVENTION

This invention relates to an apparatus for heat sealing a plastic film cover over an open food container to produce an airtight package and particularly to improved heat sealing and trimming means.

Machines for heat sealing a plastic film cover or closure portion to an open plastic container are known in the art. Such machines are used to advantage in the preparation of pre-wrapped sandwiches which are to be dispensed from vending machines and it is imperative that the sealed container be completely airtight to avoid spoilage of the packaged merchandise.

The problems of adequately sealing plastic film to a high impact styrene container are considerable, primarily because of the sensitive heat and pressure control requirements. This has led, in many instances, to the use of special film, either of the pressure-sensitive type or the heat-activated, laminated type, which seal within a wide range of temperature and pressure or dwell time.

Another problem lies in the trimming or cutting of the plastic film, following heat sealing, in an efficient manner so that the seal is not impaired. The solution of this problem depends upon the satisfactory delivery of the film to the heat sealing station in a suitably tensioned condition. This has been achieved in the past only with relatively complicated, and therefore expensive, holding and feed devices.

Yet another problem lies in achieving correct clamping alignment of the mating heat sealing parts. The solution of this problem is particularly difficult when the sealing head is swingingly related to the container support and one approach is to provide close tolerances in the connections of the moving parts. Again, this is an expensive solution.

The present heat sealing apparatus solves the above and other problems in a manner not disclosed in the known prior art.

SUMMARY OF THE INVENTION

This heat sealing apparatus provides a means of heat sealing a plastic film cover to an open plastic container and includes a heat sealing head providing efficient distribution of heat and pressure to the contact surface of the head engaging the film so that plastic film can be used which does not have special pressure sensitive or laminated characteristics.

The apparatus provides a film roll mounting which ensures delivery of the film to the container without the need for a spindle, and said apparatus provides a cutter which tensions the film during the cutting action.

A container support is provided which is resiliently mounted so that the pivoted lever arm carrying the heat sealing head can readily be aligned with the container support to achieve even clamping pressure between the container and the plastic film.

This heat sealing apparatus is relatively inexpensive to manufacture and can be used by anyone with little or no instruction. In addition, the superior fusion qualities afford considerable overall savings in the preparation of pre-packaged foods because conventional rather than special plastic film can be used for the container closure portions.

It is an important object of this invention to provide a self-contained, heat-sealing apparatus which includes a base carrying a resilient support means for a plastic container, and journal mounting means for supporting a roll of film for withdrawal of the film across the container margin portions; and to provide a lever pivotally mounted to the base and carrying a sealing head and a cutter means spaced from the pivotal mounting for swinging movement into clamping engagement with the film, the sealing head including a platen providing opposed margin portions having spaced lands and grooves registrable with the container margin portions, and the cutter means providing a blade having adjacent clamping elements to facilitate severing of the film by the blade.

Another object is to provide the platen with a substantially rectangular recessed portion defined by peripherally continuous, alternating lands and grooves on said platen margin portions.

Yet another object of the invention is to provide support means for the container including a U-shaped pedestal portion having an open rectangular frame extending between the legs thereof and providing a peripheral, resilient seating pad for the container, and said support means including a resilient bearing pad between the pedestal portion and the base, said resilient pads cooperating to provide self-alignment of the container under pressure from the platen.

Still another object is to provide journal mounting means for the film which includes spaced pairs of oppositely inclined bearing strips, each pair defining a V-notch journal bearing for the roll of film, and to provide end stops engageable with the film to locate said film in said journal bearing.

It is an object of the invention to provide spaced abutment portions between the support means and the mounting means defining a gap, said film extending across said gap; to provide the cutter means with a blade shield providing the clamping elements, said elements being engageable with the film above said abutment portions for clamping the film prior to severing by the blade; and to provide the blade shield with a resilient mounting relative to said blade.

Yet another important object is to provide a lever having a substantially U-shaped configuration, including spaced arms having remote ends and a bight portion, said heat sealing head and said cutter means being connected between said arms, and said lever being pivotally connected to the base between the remote ends of the arms and said bight portion; and to provide spring means having one end connected to the arms rearwardly of the pivotal connection, and the other end connected to the base forwardly of the pivotal connection.

BRIEF DESCRIPTION OF THE DRAWINGS

FIG. 4 is a fragmentary plan view showing the underside of the heat sealing platen and the cutter assembly;

FIG. 5 is a cross section taken on line 5—5 of FIG. 4;

FIG. 6 is an enlarged detail of the cutter assembly, prior to the severing of the film;

FIG. 7 is an enlarged detail of the cutter assembly following severing of the film; and FIG. 8 is a fragmentary cross section taken on line 8—8 of FIG. 6.

DESCRIPTION OF THE PREFERRED EMBODIMENT

Figure 1:
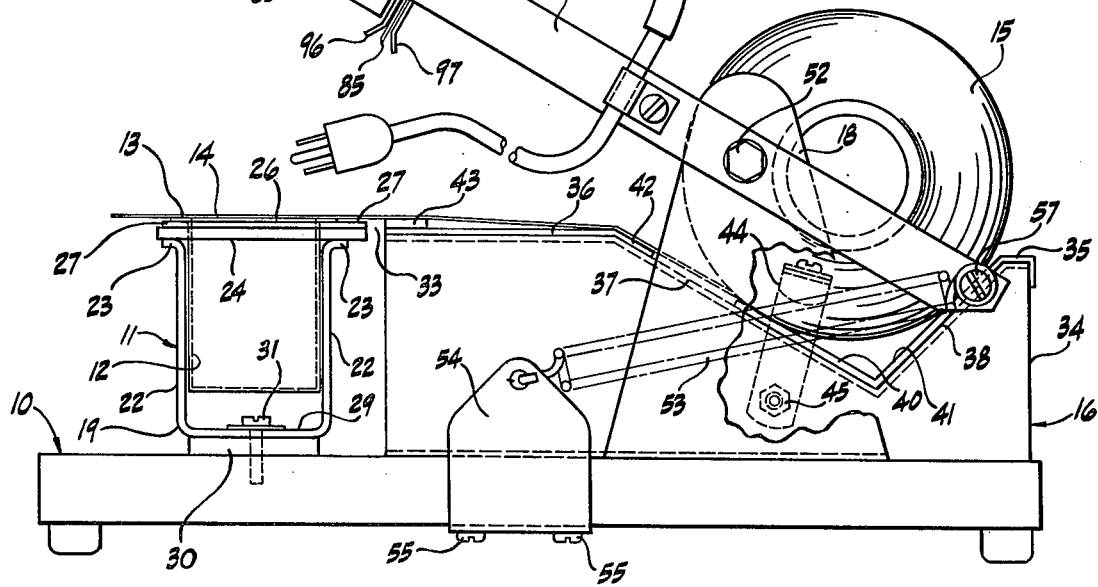
FIG. 1 is an elevation view of the heat sealing apparatus.

Referring now by characters of reference to the drawings and first to FIG. 1 it will be understood that the heat sealing apparatus includes a base 10 having a support assembly 11 mounted thereon to provide a support means for a plastic food container 12. The container 12 includes a peripheral flange 13 providing opposed margin portions and defining an open end, which is to be closed by heat sealing a cover of plastic film thereto and said cover, indicated by numeral 14, is dispensed and cut from a web or roll 15 which is carried by a film mounting assembly 16. In order to effectuate the heat sealing and severing of the film portion 14 a U-shaped lever 17 is provided which is pivotally mounted between a pair of spaced posts 18 carried by the base 10. The lever 17 carries a heat sealing head 20, for heat sealing the cover 14 to the container 12, and a rearwardly disposed cutter assembly 21 for tensioning the film, and severing the film portion providing the cover 14, from the web.

The primary parts of the apparatus noted above will now be described in greater detail. The support assembly 11 is provided by a U-shaped metal frame 19 having outwardly turned lips 23 at the remote ends of arms 22. The frame 19 provides a pedestal for rectangular metal frame 24 which extends between said lips 23 and is attached thereto as by spot welding. The metal frame 24 is provided with an inner opening 25 and superjacently mounted to said frame 24 is a peripherally continuous pad 26 of foam rubber, or the like. The pad 26 is attached to the frame 24 as by adhesive and includes longitudinally spaced sides 27 and transversely spaced sides 28 in register with the opening 25. The body of the container 12 is received by the opening 25 and the sides of the pad 26 provide resilient margin portions seating the container flange 13. The U-shaped frame 22 is resiliently mounted to the base by means of another pad of foam rubber, or the like, which is disposed between the base 10 and the bight 29 of said frame 22. The pad 30 is substantially co-extensive with the bight 29 and the frame 22 is secured to the base 10 as by fasteners 31. It will be understood that the upper pad 26 provides a localized resilient mounting for the container flange 13 while the lower pad 30 provides a general resilient mounting for the support assembly 11 as a whole.

The mounting assembly 16 provided for the film roll 15 includes spaced, channel-shaped wall members 34 which are attached to the base 10 as by spot welding. At the rearward end the wall members are interconnected by a transverse framing member 35 and at the foward end by a platform member 36. Each of the wall members 34 includes oppositely inclined flanges 37 and 38 provided with plastic bearing strips 40 and 41 respectively. Strips 40 and 41 define a V-notch journal bearing which receives the film roll 15 in substantially friction-free sliding relation so that when the leader is pulled from the roll 15, the roll simply rotates on the strips 40 and 41. The platform member 36 includes a downwardly turned lip 42 at the rearward end to preclude inadvertent tearing of the film. At the forward end the platform 36 includes a resilient strip 43 of foam rubber, or the like, and said strip 43 and the rearward side 27 of the resilient pad 26 cooperate to define spaced abutment portions providing a gap 33 receiving the blade of the cutter assembly 21 therebetween as will be described.

Figure 2:
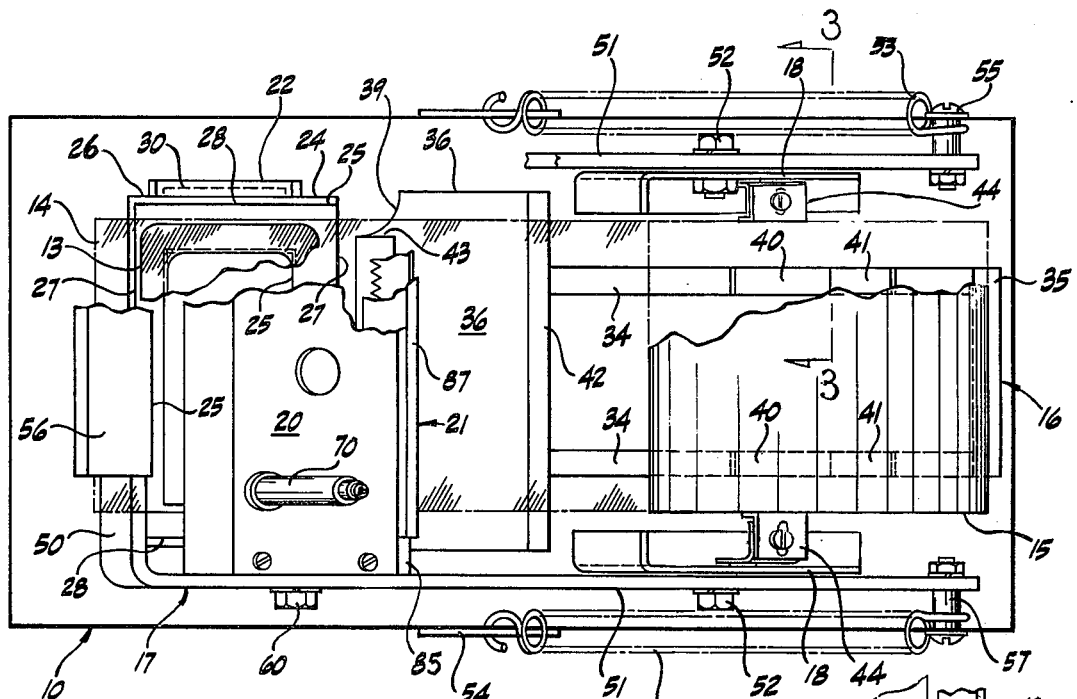
FIG. 2 is a plan view partly broken away to reveal the underlying structure.
Figure 3:
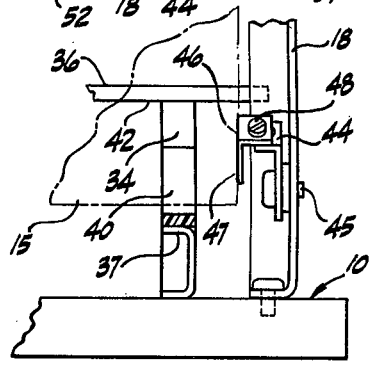
FIG. 3 is a fragmentary cross section taken on line 3—3 of FIG. 2.

As shown in FIGS. 2 and 3, the film roll 15 is transversely positioned on the bearing strips 40 and 41 by means of adjustable stop elements 44 which are pivotally mounted to associated posts 18 by means of fasteners 45 and include an adjustable angle member 46 providing a lip 47 engageable with the end of the roll 15. The angle member 46 is provided with a bolt and slot arrangement generally indicated by numeral 48 to permit sideways adjustment more conveniently to accommodate slight variations in the width of the film roll 15. As shown particularly in FIG. 2 the platform member 36 includes cut-out portions 39 at its forward corners to facilitate grasping of the film leader by the index finger and thumb of the operator.

The U-shaped lever 17 includes a bight portion 50 and opposed arms 51 pivotally mounted to associated posts 18 by pivot assemblies 52. The remote end of each arm 51 extends rearwardly of its associated pivot assembly 52 and each remote end includes a bolt assembly 57. A tension spring 53 extends between each bolt assembly 57 and an apertured lug 54, which is disposed forwardly of the pivot assembly 52 and is attached to the base 10 as by fasteners 55 to form part of said base. The tension springs 53 provide an upward bias to the lever 17 to maintain the forward end of the lever 17 in spaced relation from the container support assembly as shown in FIG. 1. The lever 17 is swung downwardly to the heat sealing position manually by grasping the handle 56 provided on the lever bight portion 50.

The heat sealing head 20 is mounted forwardly of the lever pivot assembly 52 and extends between the arms 51 to which it is attached as by opposed fasteners 60. Essentially, the heat sealing head 20 is located on the arms 51 in such a position that when the lever 17 is swung downwardly, the platen assembly 20 connected by fasteners 60 is substantially aligned with the container support assembly 11 above the container 12. The heat sealing head 20 is best understood by reference to FIGS. 4 and 5. As shown, said sealing head includes a platen of metal, such as an aluminum casting, which is preferably coated on the sealing face by Teflon or the like. Spacer members 62 of insulation material are attached to each side of the platen 61 by means of fasteners 63 and the platen is provided with longitudinal grooves 64 to facilitate attachment of said side members 62. The side members 62 extend above the block 61, and a cover plate 65, which is attached to the block as by fasteners 66, cooperates with said side members 62 to define a housing for a heating element 67. The heating element 67 by which the platen is electrically heated, is connected to a power cable 70, and the cover plate 65 is provided with a removable closure plug 71 which affords access to a thermostatic control adjustment screw 72.

Importantly, the platen 61 is provided with a cavity or recess 73 defined by opposed longitudinally spaced margin portions 75 and opposed transversely spaced margin portions 76. The margin portions each include spaced grooves 80 and 81 which, in the preferred embodiment are peripherally continuous, and which are separated by a land 82 and flanked by lands 83 and 84. As shown particularly in FIG. 7 the margin portions of the platen are aligned, in the heat sealing position, with the flanges 13 of the container 12 so that when the film portion 14 is drawn across said flanges, the lands 82, 83 and 84 engage the film above said flange 13. The effect of the lands and grooves is to provide a plurality of spaced sealing lines which provide a highly efficient triple seal between the film cover 14 and the container 12. It will be understood that the film 14 is sufficiently wide that this triple seal extends all around the container flange 13 in the preferred embodiment.

The cutter assembly 21, which is shown particularly in FIGS. 4, 6, 7 and 8 provides a means of severing the film cover 14 from the web just prior to the heat sealing action. The cover 14 is severed by a blade 85, which extends between the lever arms 51 and is attached as by fasteners 86 to the insulated members 62 at each side of the platen 61. The blade 85 is received by the gap 33 between the rearward side 27 of the container support assembly resilient pad 26, and the resilient strip 43 at the forward end of the platform member 36. Importantly, the cutter assembly includes a U-shaped clamping shield 87 which is provided with forward and rearward legs 90 and 91 and is movably mounted in embracing relation to the blade 85. The shield 87 is resiliently mounted to the blade 85 by means of a projecting lug 92, provided by a cut-out from the body of the blade 85, and a projecting lug 93, provided by a cut-out from the shield rearward leg 91. The forward leg 90 is provided with a vertical slot 94 receiving lug 92 therethrough and both of the lugs 92 and 93 are apertured for attachment of a tension spring 95 therebetween which biases the shield 87 into engagement with the blade 85 when the apparatus is not in use so that the blade is relatively retracted and thereby protected by said shield. The forward and rearward legs 90 and 91 of the blade shield 87 include inclined clamping fingers 96 and 97 respectively at their lower end and, when the cutter assembly 21 is swung downwardly by the lever 17, said fingers engage and clamp the film cover portion 14 to the resilient frictional material provided by members 27 and 43 respectively on each side of the gap 33 as shown in FIG. 6. Upon continued downward movement, the blade 85 engages and severs the film cover portion 14 from the web as shown in FIG. 7. It will be understood from FIGS. 7 and 8 that during such continued downward movement of the blade 85, the spring 95 exerts a bias on the clamping fingers 96 and 97 and that when the lever 17 is raised following heat sealing the spring 95 returns the shield 87 to its former position.

It is thought that the structural features and functional advantages of this heat sealing apparatus have become fully apparent from the foregoing description of parts but for completeness of disclosure the operation of the device will be briefly described.

As shown in FIGS. 1 and 3 the roll of plastic film is seated upon the inclined, relatively smooth strips 40 and 41 and is endwise positioned by stop elements 44. The relatively friction-free surfaces by which the film roll 15 is supported permit the film to be withdrawn from the roll by simply pulling on the film causing the roll to rotate within the vee-notch journal provided by said bearing strips 40 and 41. A container 12 is inserted in the opening 25 provided in the upper rectangular frame 24 of the support assembly 11, so that the peripheral flange 13 engages and seats on the resilient margin portions of the rectangular pad 26 defining said opening. The film is drawn over the platform 36 and across the container 12 so that it just covers the most forward portion of the peripheral flange 13 of said container. The container 12 can be either rectangular or triangular in overall configuration to suit two halves of a sandwich (not shown) and the cavity 73 in the heat sealing heat platen 61 ensures that the sandwich can protrude above the general elevation of the container flanges 13. This arrangement ensures that film covering the sandwich does not engage the platen, and thereby effectively precludes burning of said sandwich. The lever 17, which carries the heat sealing head 20 and the cutter assembly 21, is pivotally mounted to the base posts 18 and is upwardly biased by the springs 53 connected to the rear end of said lever. The sealing head 20 is so located on the lever 17 that when the lever is lowered, and the platen 61 is substantially horizontal, the peripherally continuous grooved margin portions 75 and 76 of the platen are in register with the peripheral flange 13 of the container 12. The container support assembly 11 is mounted on a pad of foam rubber 30, so that the support assembly provides a resilient anvil, and the container flange 13 is seated on a margin of similar material. This arrangement ensures that the container can yield so that the bearing pressure from the platen will be uniformly distributed. Moreover, the specific grooved arrangement of the platen 61 ensures full heat distribution along lines corresponding to the lands 82-84 which are intermittently spaced with the grooves 80 and 81 which, in the preferred embodiment, are between 0.03—0.04 in wide. Thus, rather than a flat pressure interface the sealing is provided by a plurality of sealing lines which seal the two faces efficiently together and the airtight seal is enhanced by the air gaps between the intermittently sealed cover and container. The heat sealing temperature can be adjusted by the thermostatic control screw 72 on the heating element 67 to suit the type of material being sealed and the provision of spaced sealing lands separated by air grooves, coupled with the use of a solid aluminum casting eliminates sudden temperature changes and facilitates heat control. This arrangement permits considerable pressure variation which is particularly important with a manually operated device.

The provision of resilient seating strips on either side of the gap 33 enhances the ability of the cutter assembly 21 to sever the cover 14 efficiently. The pressure from the blade shield fingers 96 and 97 holds the film spanning the gap 33 tightly because of the relatively high degree of frictional engagement between the film and the foam rubber material which inhibits sliding of the film during cutting. The severing of the film occurs immediately before engagement of the platen 61 with the film and the cutting action is considerably facilitated because the blade 85 tensions the film portion spanning the gap as it is being cut.

The actual cutting and heat sealing operations occur almost simultaneously and are achieved by simply grasping the lever handle 56 and swinging the lever 17 downwardly into engagement with the film. It requires only momentary engagement of the platen 61 with the film cover portion 14 to effectuate the sealing and severing of the cover to the container, following which the lever 17 is returned to the upward position assisted by the bias of the spring 53. The cut-out portions 69 at the forward end of the platform 36, adjacent the gap 33, permit easy grasping of the film so that it may be pulled forward the requisite amount to cover the container peripheral flange 13 in preparation for heat sealing another portion of the film to another container 12.

The heat and pressure control demonstrated by the apparatus permits a film cover formed from material such as oriented polystyrene to be effectively sealed to a container formed from high impact styrene.

We claim as our invention:

1. In an apparatus for heat sealing a plastic film cover to an open container having laterally extending, opposed margin portions defining the container opening:
   a. a base,
   b. support means for the container, the support means including an upper seating portion receiving the container margin portions in seating relation,
   c. mounting means for supporting a roll of film for withdrawal of the film across the container margin portions,
   d. a lever pivotally mounted for swinging movement relative to the base,
   e. a sealing head carried by the lever above the support means, in spaced relation to the pivotal mounting of the lever, for swinging movement of said head into clamping engagement with the film on the container margin portions, the sealing head including:
      1. a heated platen having opposed margin portions substantially in register with the container margin portions when the film is clamped for heat sealing, each heated platen margin portion including a first groove portion located laterally outward of the container opening, the first groove portion being peripherally continuous to provide a complete seal inwardly thereof, and a second groove portion spaced outwardly of and substantially parallel to the said first groove portion to provide an elongate land therebetween, the land providing a seal between the first and second groove portions,
   f. cutter means carried by the lever for severing the film drawn across the container from the roll,
   g. the support means and the mounting means cooperating to provide spaced abutment portions rearwardly disposed of the container and engageable by the film, said abutment portions defining a gap therebetween and said film extending across said gap,
   h. the cutter means including a blade carried by the sealing head and rigidly fixed relative to the sealing head and lever, the blade being movable into the gap to cut the film as the head is moved by the lever into engagement with the film, and spaced clamping elements mounted in movable relation to and on the blade, one clamping element being located adjacent each side of the blade, each clamping element having a lower clamping margin engageable with the film against an associated abutment portion to clamp the film across the gap as the head is moved by the lever into engagement with the film, and resilient means between the blade and clamping elements tending to urge the lower clamping margins below the blade so that the clamping margins will engage and clamp the film and then permit the blade to move below the lower clamping margins to cut the film, all under loading of the resilient means, in sequence by moving the head with the lever into engagement with the film,
   i. the blade including a transversely projecting lug,
   j. the clamping elements forming a substantially U-shaped blade, and the shield including a transversely projecting lug, and
   k. the resilient means including a tension spring extending between said lugs to provide the resilient mounting of said shield to said blade.

* * * * *